United States Patent [19]
Tischer

[11] Patent Number: 5,916,326
[45] Date of Patent: Jun. 29, 1999

[54] CONTROL DEVICE USING A SINGLE ACTUATOR TO ROTATE AND TRANSLATE A SHIFT SELECTOR FOR AUTOMATICALLY OPERATING A MANUAL TRANSMISSION OF A VEHICLE

[75] Inventor: Dieter Tischer, Wendlingen, Germany

[73] Assignee: Hydraulik-Ring Antriebs- und Steuerungstechnik GmbH, Nürtingen, Germany

[21] Appl. No.: 08/820,695

[22] Filed: Mar. 18, 1997

[30] Foreign Application Priority Data

Mar. 18, 1996 [DE] Germany .................. 196 10 491

[51] Int. Cl.$^6$ .................................................. B60K 20/00
[52] U.S. Cl. ........................ 74/335; 74/473.1; 74/473.12
[58] Field of Search ................ 74/335, 473.11, 74/473.12, 473.24, 473.25, 473.3, 473.1

[56] References Cited

U.S. PATENT DOCUMENTS

| | | | |
|---|---|---|---|
| 925,270 | 6/1909 | Beemer | 74/473.12 X |
| 1,336,796 | 4/1920 | Taylor | 74/473.12 X |
| 4,821,590 | 4/1989 | Tury et al. | 74/335 |
| 4,938,088 | 7/1990 | Langley et al. | 74/473.1 X |
| 5,251,503 | 10/1993 | Morris et al. | 74/335 X |
| 5,623,852 | 4/1997 | Tischer et al. | 74/335 X |
| 5,706,712 | 1/1998 | Tischer et la | 74/335 X |
| 5,749,264 | 5/1998 | Broadbent | 74/335 |
| 5,823,053 | 10/1998 | Stengel et al. | 74/473.12 X |

*Primary Examiner*—Khoi Q. Ta
*Attorney, Agent, or Firm*—Robert W. Becker & Assocates

[57] ABSTRACT

A control device for automatically operating a transmission of a vehicle has at least one actuator for moving a selector shaft of the transmission by rotation and axial translatory movement in order to select a gate and a gear of the manual transmission. A control member is coupled to the at least one actuator so as to be rotated by the at least one actuator. The control member includes a gate change for effecting the axial translatory movement of the selector shaft and a control path for rotating the selector shaft.

22 Claims, 5 Drawing Sheets

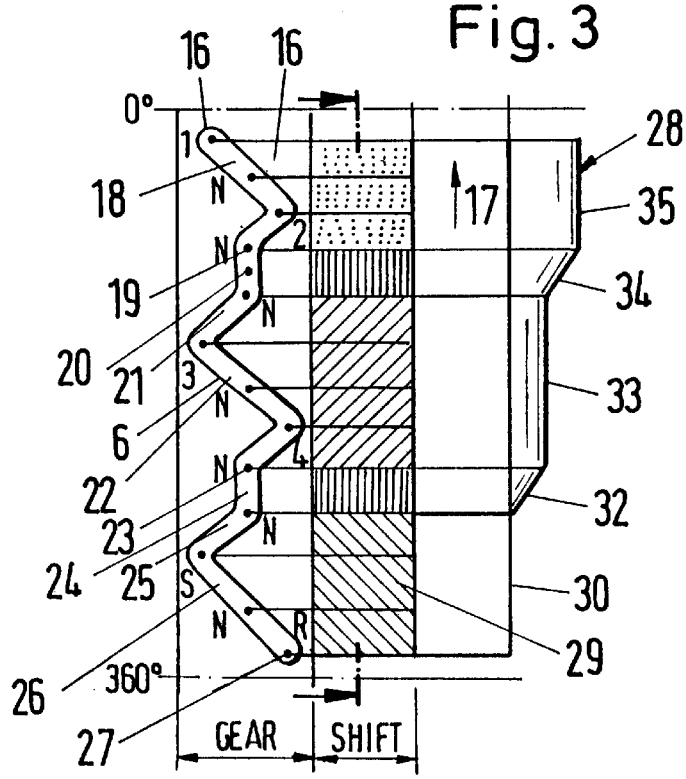
Fig. 3
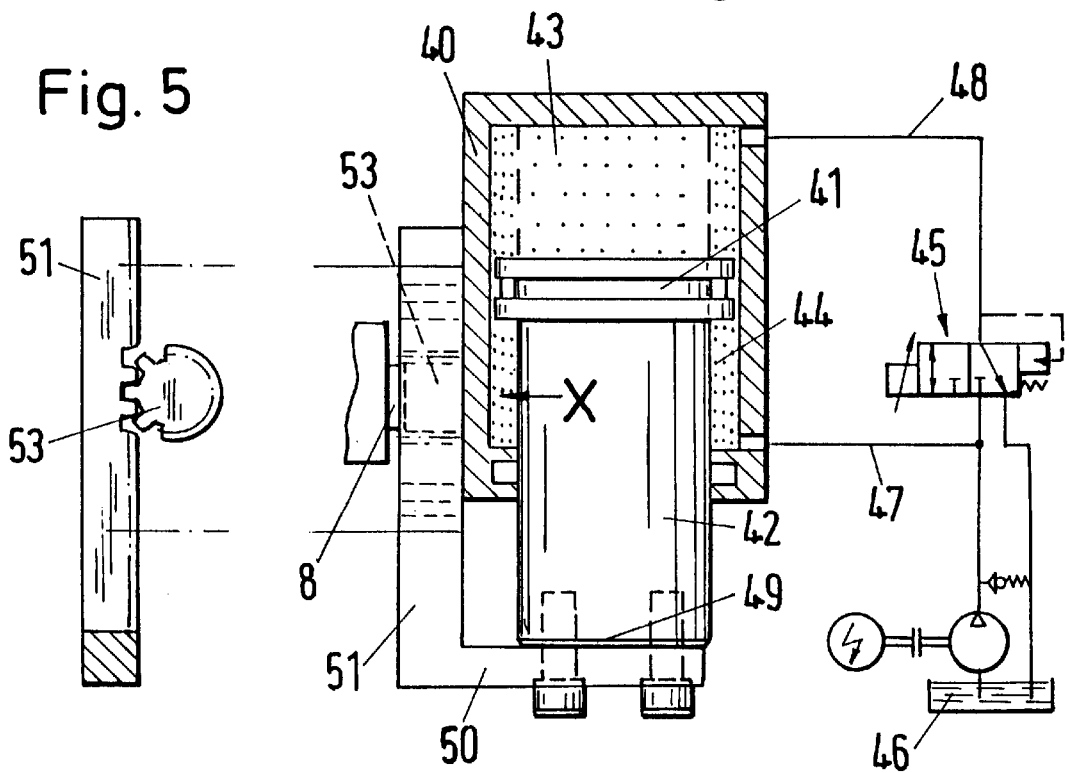
Fig. 4
Fig. 5

CONTROL DEVICE USING A SINGLE ACTUATOR TO ROTATE AND TRANSLATE A SHIFT SELECTOR FOR AUTOMATICALLY OPERATING A MANUAL TRANSMISSION OF A VEHICLE

BACKGROUND OF THE INVENTION

The present invention relates to a control device for automatically operating a manual transmission of vehicles wherein the selector shaft of the transmission is rotatable by at least one actuator about its axis and displaceable in the axial direction for selecting a gate and a gear of the transmission.

In manual transmissions it is known to shift gears with a gear shifting shaft projecting into the passenger compartment of the vehicle. In order to operate automatically such a manual transmission, control devices are known which comprise actuating devices positioned at an angle or parallel to one another. With such actuating devices the selector shaft of the transmission can be respectively rotated and displaced in the axial direction.

It is an object of the present invention to embody a control device of the aforementioned kind such that for a simple construction only a minimal constructive height is required.

SUMMARY OF THE INVENTION

A control device for automatically operating a manual transmission of a vehicle according to the present invention is primarily characterized by:

At least one actuator for moving a selector shaft of the transmission by rotation and axial translatory movement in order to select a gate and a gear of the manual transmission;

A control member coupled to the at least one actuator so as to be rotated by the at least one actuator;

The control member comprising a gate change for effecting the axial translatory movement of the selector shaft and a control path for rotating the selector shaft.

Preferably, the actuator is a hydraulically operated piston-cylinder unit.

Advantageously, the actuator comprises a toothed rack and the control member comprises a gear wheel. The toothed rack meshes with the gear wheel.

Preferably, the axis of the control member extends parallel or perpendicular to the axis of rotation of the selector shaft.

The gate change is preferably a depression in the control member.

The gate change is located at the periphery of the control member.

Preferably, the control member is a sleeve or a disk.

The gate change is preferably located at the bottom side of the disk.

The gate change, in the circumferential direction of the control member, has upwardly and downwardly inclined guide portions for selecting the gears of the transmission. In this context, "upwardly" and "downwardly" is used in the mathematical sense (i.e., an upward or positive slant extends from the bottom left to the top right of a graph, a downward or negative slant extends from the top left to the bottom right of a graph).

The gate change expediently has neutral guide portions for selecting a neutral position of the transmission, which guide portions extend in the circumferential direction of the control member.

The control path preferably includes control path sections extending concentrically to the axis of rotation of the control member, for selecting gates of the transmission.

The control path sections have different spacings from the axis of rotation of the control member.

The control path sections are located at a periphery of the control member.

Advantageously, the control member has an underside facing the selector shaft and the control path sections are positioned at different spacings relative to the underside of the control member.

The control path sections are preferably located on a common circle about the axis of rotation of the control member.

The control path sections have end faces extending parallel to one another and parallel to the underside of the control member.

The control path includes inclined portions positioned between the control path sections for connecting the control path sections.

The inclined portions are preferably correlated with the neutral guide portions of the gate change.

The device preferably further comprises a drive member axially fixedly connected to the selector shaft, whereby the drive member comprises a guide element engaging the gate change.

Preferably, the drive member is secured against rotation.

The control device may comprise a rotary part having a sensor, the sensor resting on the control path.

Preferably, the rotary part is fixedly connected to the selector shaft.

It is also possible that the rotary part is slidably connected to the selector shaft.

The sensor is preferably spring-loaded toward the control path.

The rotary part is preferably a sleeve having two opposed arms extending transverse to the central axis of the sleeve.

The sensor is preferably connected to the first one of the two opposed arms. A return element is preferably connected to the second one of the opposed arms.

The return element rests spring-loaded on the control member.

The sensor is a transverse arm extending transversely from the rotary part.

The sensor may comprise a glide member and the glide member contacts the control path.

In another embodiment of the present invention, a control device for automatically operating a manual transmission of a vehicle is primarily characterized by:

At least one actuator for moving a selector shaft of the transmission by rotation and axial translatory movement in order to select a gate and a gear of the manual transmission;

A control member coupled to the at least one actuator so as to be rotated about the axis of rotation by the at least on actuator;

The control member comprising a gate change for effecting rotation of the selector shaft;

A control arm rotationally fixedly connected to the selector shaft;

The control arm having a guide element engaging the gate change.

Preferably, the actuator is a hydraulically operated piston-cylinder unit.

The actuator may comprise a toothed rack and the control member may comprise a gear wheel, whereby the toothed rack meshes with the gear wheel.

Expediently, the axis of the control member extends parallel or perpendicular to the axis of rotation of the selector shaft.

The gate change may be a depression in the control member. The control member may preferably be a disk.

The gate change is located at the bottom side of the disk.

The gate change in a circumferential direction of the control member has upwardly (i.e., increasing the radial distance to the axis of rotation) and downwardly (i.e., decreasing the radial distance to the axis of rotation) inclined guide portions for rotating the selector shaft about the axis of rotation.

The gate change, in the circumferential direction of the control member, may have circumferential guide portions for selecting gates of the transmission.

The circumferential guide portions are preferably positioned concentrically to the axis of rotation of the control member and are spaced at different radial spacings from the axis of rotation.

The control device may comprise two such actuators wherein the first the actuator rotates the selector shaft of the transmission and the second actuators moves the selector shaft by axial translatory movement.

The control arm may extend transversely to the selector shaft.

In the inventive control device according to the first embodiment only a single actuator is provided for rotating and displacing the selector shaft of the transmission. With this actuator the control member, comprising the gate change and the control path, is rotated. With the gate change the selector shaft can be axially displaced (axial translatory movement) in the required direction while with the aid of the control path the selector shaft can be rotated in the desired direction. Thus, by rotation and axial displacement of the selector shaft the respective gate can be selected and the respective gear can be shifted. The inventive control device is comprised of only a few components that are of a constructively simple design and can thus be manufactured inexpensively. Furthermore, they require only a minimal constructive height so that the control device can be mounted even where only a minimal, respectively, especially a very low mounting space is available.

The inventive control device according to the second embodiment of the present invention has a rotatable control member whereby a guide element of the control arm engages the gate change of the control member. The control member is adjusted according to the course of the gate change. Since the control member is rotationally fixedly connected to the selector shaft, the selector shaft is thus also rotated about its axis by the respective amount. In this manner, the required gate selection for the transmission is performed.

BRIEF DESCRIPTION OF THE DRAWINGS

The object and advantages of the present invention will appear more clearly from the following specification in conjunction with the accompanying drawings, in which:

FIG. 3 shows a developed projection of a control member of the control device according to FIG. 1;

FIG. 4 shows a section along the line IV of FIG. 1;

FIG. 5 shows in a side view an actuator of the control device;

DESCRIPTION OF PREFERRED EMBODIMENTS

Figure 1:
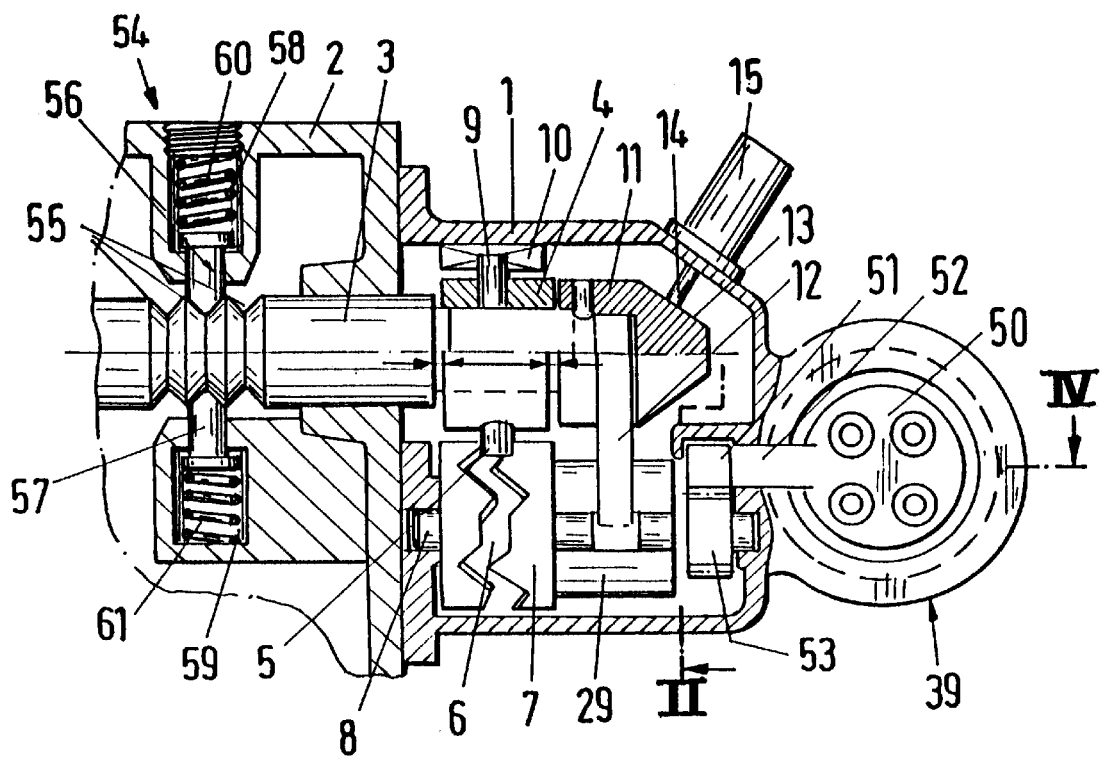
FIG. 1 shows in longitudinal section a first embodiment of the inventive control device.

The present invention will now be described in detail with the aid of several specific embodiments utilizing FIGS. 1–11.

The control device for automatically operating manual transmissions of vehicle is shown in the drawings. With the control device the selector shaft of the transmission of the vehicle can be rotated about its axis and axially displaced for selecting the gear and gate of the transmission.

The control device according to FIGS. 1–5 is enclosed in a housing 1 that is flanged onto the gearbox housing 2 of the vehicle. The selector shaft 3 of the transmission projects from the gearbox housing 2 and extends into the housing 1. Within the housing 1 an axially displaceable sleeve 4 is seated on the selector shaft 3 which engages with a radially projecting bolt 5 the slot-shaped gate change 6. The gate change 6 is provided at the periphery of a control member 7 which is seated on an axle 8 supported within the housing 1 and extending parallel to the selector shaft 3. As is shown in FIGS. 1 and 3, the gate change 6 has various upwardly and downwardly inclined guide portions for selecting a respective gear.

The sleeve 4 is secured by a further radially projecting bolt 9 against rotation about its axis. The selector shaft 3 can be rotated relative to the sleeve 4 about its axis for selecting a gate of the transmission in a manner which will be disclosed in the following. For rotationally securing the sleeve 4, the bolt 9 engages and cooperates with guides 10 extending in the axial direction of the selector shaft 3. The guides 10 are of such a length that the bolt 9, upon axial displacement of the selector shaft 3, cannot become disengaged from the guides 10.

A further sleeve 11 is rotationally and axially fixedly connected on a side of the sleeve 4 facing away from the gearbox housing 2. A control arm 12 extends transversely from the sleeve 11. The sleeve 11 has, viewed in axial section, an essentially conical measuring surface 13 which tapers in the direction of the end face of the sleeve 11. Furthermore, the measuring surface 13 is inclined in the circumferential direction. A sensor 14 of a travel measuring system 15 rests under pressure on the measuring surface 13. For example, it is biased by a spring force. When the selector shaft 3 and thus the sleeve 11 are axially displaced, the sensor 14, depending on the displacement direction of the selector shaft 3, is moved into the travel measuring system 15 or removed therefrom. Thus, an exact axial position determination of the selector shaft 3 is possible. Since the measuring surface 13 in the circumferential direction is provided with an incline, a position determination with the travel measuring system 15 is also possible when the selector shaft 3 is rotated about its axis.

The travel measuring system 15 is flanged onto the exterior side of the housing 1. The sensor 14 extends through a housing opening and rests under pressure on the measuring surface 13 of the sleeve 11.

The control member 7 is in the form of a sleeve and comprises a gate change 6 extending in the circumferential direction. In the circumferential direction the guide change 6 has upwardly and downwardly inclined guide portions. In FIG. 3 a developed projection of the gate change 6 is represented. When the control member 7 is rotated about its axis, depending on the incline of the different inclined guide portions of the gate change 6, the sleeve 4, is moved forwardly or rearwardly in the axial direction because of its engagement with the bolt 5. Since the sleeve 4 is axially fixedly connected to the selector shaft 3, the selector shaft 3, in turn, is axial entrained. As shown in the developed projection of FIG. 3, the bolt 5 is positioned at one end 16 of the gate change 6. In this position, the sleeve 4 and thus the selector shaft 3 are displaced axially within the gearbox housing 2 in order to shift into first gear. When the control member 7 is rotated in the direction of arrow 17 (FIG. 3), due to the downwardly extending guide portion 18 of the guide change 6, the sleeve 4 is displaced with the bolt 5 axially into the housing 1 until at the end of this guide portion 18 the second gear has been shifted. In order to reach the neutral position N from the second gear, the control member 7 is further rotated in the direction of arrow 17 whereby the bolt 5 is moved from the guide portion 18 into the guide portion 19 of the gate change 6. Guide portion 19 has an upward incline in the rotational direction. When the neutral position N has been reached, this upwardly inclined guide portion 19 has a transition into a guide portion 20 which extends in the circumferential direction. When the bolt 5 is positioned within the guide portion 19, the sleeve 4 and thus the selector shaft 3 are again moved into the gearbox housing 2 upon rotation of the sleeve 4. When the neutral position N is reached, the bolt 5 reaches the guide portion 20. Since this guide portion 20 extends in the circumferential direction of the control member 7, the sleeve 4, upon rotation of the control member 7, remains in its axial position i.e., the sleeve 4 and the selector shaft 3 are not axially displaced.

In order to shift into the third gear from the neutral position N, an upwardly inclined guide portion 21 is connected to the guide portion 20 which, in the direction of rotation 17, has connected thereto a downwardly inclined guide portion 22. The bolt 5 is moved within this guide portion 22 when shifting from the third into the fourth gear. As is shown in connection with shifting from first to second gear, the bolt 5 crosses the neutral position N. From the fourth gear, it is possible to switch into the neutral position N because the guide portion 22 has a transition in the rotational direction 17 into an upwardly inclined guide portion 23. Connected thereto is a guide portion 24 which, as disclosed in connection with guide portion 20, extends in the circumferential direction of the control member 7. Thus, the sleeve 4 is not axially displaced when the bolt 5 is positioned within this guide portion 24. From this neutral position N, the transmission can be shifted into fifth gear whereby the bolt 5 of the sleeve 4 is moved in rotational direction 17 into the upwardly inclined guide portion 25. Connected thereto is a guide portion 26 which in the rotational direction 17 is inclined downwardly and crosses the neutral position N.

With this guide portion 26 the reverse gear can be selected. It is selected when the bolt 5 of the sleeve 4 is in abutment at the end 27 of the guide portion 26, respectively, of the gate change 6.

In this manner, by rotation of the control member 7, the sleeve 4 and thus the selector shaft 3 can be displaced by the desired amount in the axial direction in order to select the different gears.

Figure 2:
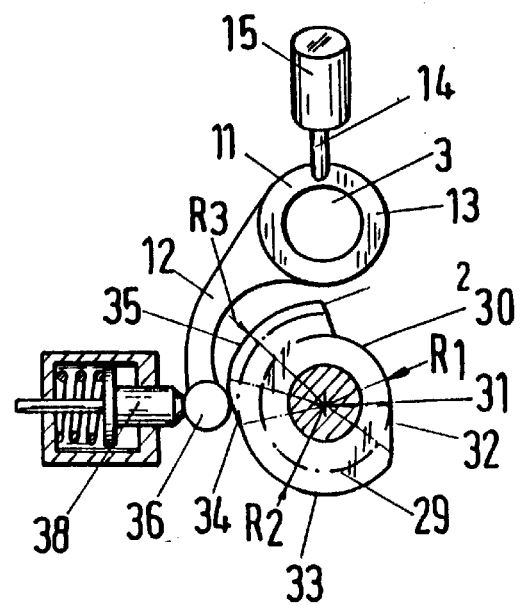
FIG. 2 shows a view along the line II of FIG. 1.

The different gears can be shifted only when the corresponding gate of the transmission has been selected. For this purpose, sleeve 11 with control arm 12 cooperating with the control path 28 is provided. The control path 28 (control surface) is positioned at the periphery of a further control member 29. The control path 28 has different heights depending on the respective gate, as is shown in the developed projection of FIG. 3. In the area of the reverse gear R and of the fifth gear, the control surface (control path) 28 has a section 30 with a predetermined initial height. As shown in FIG. 2, this control path section 30 is positioned on a radius $R_1$ about the axis of rotation 31 of the control member 29. When the selector shaft 3 is displaced by the sleeve 4 in the aforedescribed manner for selecting the fifth gear and the reverse gear R, the selector shaft 3 is not rotated about its axis because in this area the control path section 30 is provided which has the radius $R_1$. At the transition from the guide portion 25 of the gate change 6 into its guide portion 24, the control surface (control path) 28 has an inclined portion 32 which connects the control path section 30 with another control path section 33. The control path section 33 is positioned on a cylinder, which in comparison to the control path section 30 has a greater radius $R_2$ (FIG. 2). The inclined portion 32 is correlated with the guide portion 24 of the gate change 6. In this guide portion 24 the sleeve 4 is not axially displaced. Instead, the selector shaft 3 is rotated about its axis with the aid of the inclined portion 32, as will be disclosed in the following, so that the corresponding gate of the transmission can be selected.

The transition from the guide portion 24 into the guide portion 23 of the gate change 6 is correlated with the transition from the inclined portion 32 into the control path section 33. When thus the gears 3 and 4 are selected, the selector shaft 3 is displaced by the sleeve 4 and the bolt 5 axially in the required direction. Since in this area the control path section 33 has the radius $R_2$, the selector shaft 3 is not rotated about its axis.

The control path section 33 is connected with a further inclined portion 34 to the control path section 35 which is again positioned on an imaginary cylindrical mantle surface that is arranged coaxially to the axis of rotation 31 of the control member 29. The transition of the control path section 34 into the control path section 35 is correlated with the transition of the guide portion 20 into the guide portion 19 of the gate change 6. When the bolt 5 of the sleeve 4 is moved within the guide portion 20 of the gate change 6, the sleeve 4 and thus the selector shaft 3 are not axially displaced because this guide portion 20 extends in the circumferential direction of the control member 7. However, in this area via the inclined portion 34 a rotation of the selector shaft 3 about its axis is produced in order to select a different gate of the transmission. The control path section 35 extends to the height of the end 16 of the gate change 6.

The control arm 12 of the sleeve 11 rests with a glide member 36, that is preferably spherically shaped, on the control surface 28. In order for the control arm 12 to be maintained in abutment at the control path (control surface) 28 of the control member 29, a corresponding pressing device 37 is provided. It is enclosed in the housing 1 and comprises a spring-loaded piston 38 which under the spring force is forced into abutment at the control arm 12 and is loaded in direction toward the control member 29. Thus, it is ensured that the control arm 12 always remains in abutment at the control path 28.

In order to rotationally drive the axle 8 with the control member 7 and 29 about their axis, a rotary drive 39 is provided which is also advantageously enclosed in the housing 1. The rotary drive 39 has a cylinder housing 40 in which a piston 41 is enclosed that is loadable at both ends. It is seated on a piston rod 42 that projects from the cylinder housing 40. The interior of the cylinder housing 40 is divided by the piston 41 into two pressure chambers 43 and 44 which are respectively supplied with a hydraulic medium. In the connecting line from the tank 46 to the cylinder housing 40 a proportional solenoid valve 45 is provided. In the position represented in FIG. 4, the hydraulic medium is supplied from the tank 46 via the supply line 47 into the pressure chamber 44 so that the piston 41 is accordingly loaded. The hydraulic medium within the pressure chamber 43 is returned via return line 48 to the tank 46. With a respective switching of the valve 45 the piston 41 can also be loaded at the other end so that the piston rod 42 can be moved out of the cylinder housing 40.

To the end face 49 of the piston rod 42 a toothed rack 51 is connected by a holder 50. The toothed rack 51 extends parallel to the axis of the piston rod 42 while the holder 50 extends at a right angle to the toothed rack 51. Advantageously, the holder 50 is screwed onto the end face 49 of the piston rod 42 so that the toothed rack 51, when needed, can be easily exchanged. The holder 50 projects with an arm 52 (FIG. 1) into the housing 1 in which the toothed rack 51 is also positioned. The rack 51 cooperates with the gear wheel 53 that is rotationally fixedly connected to the axle 8. The axis of the toothed rack 51 is positioned perpendicular to the axle 8. When the piston rod 42 is reciprocated by pressure-loading, the axle 8 is rotated in the desired direction via the toothed rack 51 and the gear wheel 53. Since the control member components 7, 29 are seated rotationally and axially fixed on the axle 8, they are correspondingly rotated. In this manner, the selector shaft 3 can be rotated about its axis for selecting a gate with the control member component 29 and the sleeve 11. Since during selection of the gate the bolt 5 of the sleeve 4 is positioned within the guide portions 20 or 24 of the gate change 6 extending in the circumferential direction of the control member 7, the selector shaft 3 upon rotation about its axis is not axially displaced. As soon as the gate has been selected, a further rotation of the axle 8 axially displaces the selector shaft 3 for shifting into the desired gear. This is achieved upon rotation of the control member 7 since the bolt 5 of the sleeve 4 reaches the inclined portion of the gate change 6 so that the selector shaft 3 is displaced in the desired direction.

In order to secure the selector shaft 3 during rotation about its axis against accidental displacement, a locking device 54 (FIG. 1) is provided. The selector shaft 3 within the gearbox housing 2 is provided with three locking positions 55 which are provided in the form of annular grooves. They have a transition into one another and are provided at the selector shaft 3 such that diametrically oppositely arranged and spring-loaded locking bolts 56 and 57 can engage one of the annular grooves when the bolt 5 of the sleeve 4 is positioned in one of the inclined guide portions 20, 24 of the gate change 6. The length of this incline-free guide portions 20, 24 corresponds in the circumferential direction to the length of the inclined portions 32, 34 of the control path 28 of the control member 29 (FIG. 3). The locking bolts 56, 57 are positioned in receiving chambers 58 and 59 which advantageously are a unitary part of the gearbox housing 2. The pressure springs 60, 61, which load the locking bolts 56, 57 into engagement, are also positioned within the receiving chambers 58, 59. The spring force is selected such that the selector shaft 3 during selection of the gate can be secured reliably against axial displacement but that the selector shaft 3 can be easily displaced in the axial direction for selecting a gear.

It is possible to embody the bottom of the gate change 6 with different heights according to the course of the control path 28. Then, the control member component 29 is not required so that a constructive simplification results.

Figure 6:
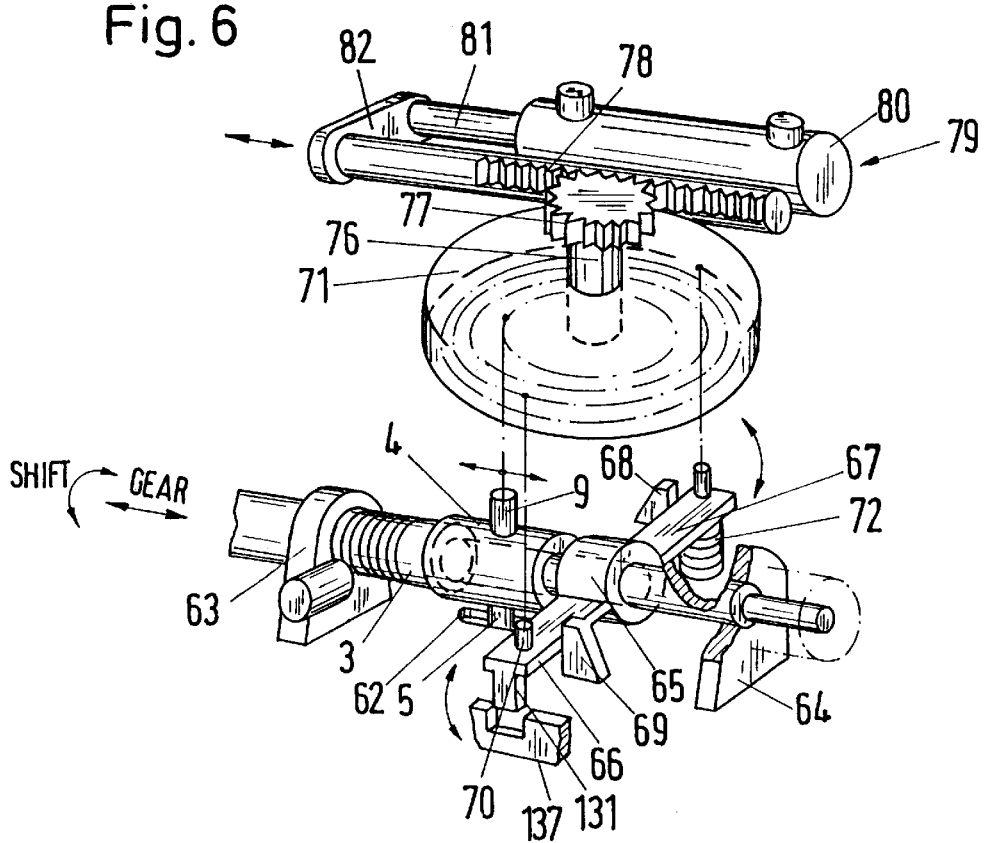
FIG. 6 shows in a perspective and exploded view a second embodiment of the inventive control device.

In the embodiment according to FIGS. 6–9, the sleeve 4 is axially non-displaceably connected to the selector shaft 3 of the transmission and comprises two diametrically oppositely arranged bolts 5 and 9. The bolt 5 extends into a slot 62 provided at the gearbox housing 2 whereby the width of the slot 62 matches the diameter of the bolt. The bolt 5 can be displaced within the slot 62 extending in the axial direction of the selector shaft 3 in a manner which will be disclosed in the following. The slot 62 serves as a rotational fixation for the sleeve 4, with the selector shaft 3 being rotatable relative to the sleeve 4, as in the previous embodiment. The selector shaft 3 is, as shown in FIG. 6, rotatably supported at two bearings 63 and 64.

In the area between the sleeve 4 and the bearing 64 a sleeve 65 is seated rotationally fixedly on the selector shaft 3. Diametrically opposed arms 66 and 67 extend in the radial direction from the sleeve 65. The arms 66, 67 are advantageously a unitary part of the sleeve 65 with which they thus form a seesaw rocker arrangement. The selector shaft 3 can, however, be axially displaced relative to the sleeve 65 in a manner which will be disclosed in the following. In order to prevent the sleeve 65 with arms 66, 67 from being entrained by the selector shaft, abutments 68 and 69 are provided at the opposite ends of the arms 66 and 67. These abutments 68, 69 are fixedly connected to the gearbox housing 2, preferably as a unitary part thereof.

A pin 70 projects from the arms 66 in a direction toward a control disk 71 (FIG. 6). The pin 70 is fixedly connected to the arm 66 and has a rounded end face. The arm 67 supports at its free end a return device 72 that ensures that the pin 70 is always in abutment at the control disk 71. The return device 72 has a sleeve-shaped receiving unit 73 in which a pressure spring 74 is enclosed with which the return pin 75 is loaded. It projects in the direction toward the control disk 71 past the arm 67 and rests under spring loading there at. The end face of the return pin 75 is also rounded.

The control disk 71 is driven so as to be rotatable about its axis. It is provided with a central projection 76 (FIG. 6) at a face thereof facing away from the sleeve 65 with arms 66, 67. A gear wheel 77 is seated on the projection 76. The axis of the gear wheel 77 coincides with the axis of the control disk 71. The gear wheel 77 engages a toothed rack 78 that is displaceable by an actuator 79. The actuator 79 comprises a control cylinder 80 which supports a non-represented piston that can be loaded at both ends. The piston is seated on a piston rod 81 that has connected thereto a bracket-like securing member 82 positioned external to the control cylinder 80. It connects the piston rod 81 to the toothed rack 78 which is positioned external to the control cylinder 80 and extends parallel thereto. By reciprocating the piston rod 81, the toothed rack 78 is displaced and, depending on the direction of displacement, the control disk 71 is rotated in the desired direction about its axis of rotation.

At the underside 83 facing the sleeve (rocker arrangement) 65 to 67, a gate change 84 (FIG. 7) in the form of a groove is provided which is engaged by the bolt 9 of the sleeve 4. The width of the gate change 84 corresponds to the diameter of the bolt 9. By rotating the control disk 71 about its axis of rotation 85, due to the engagement of the bolt 9 of the sleeve 4 in the gate change 84, the sleeve 4 and thus the selector shaft 3 are displaced in the axial direction. Via the bolt 5 the sleeve 4 is secured against rotation about its axis. Upon displacement of the selector shaft 3 the respective gears of the transmission are shifted.

Figure 8:
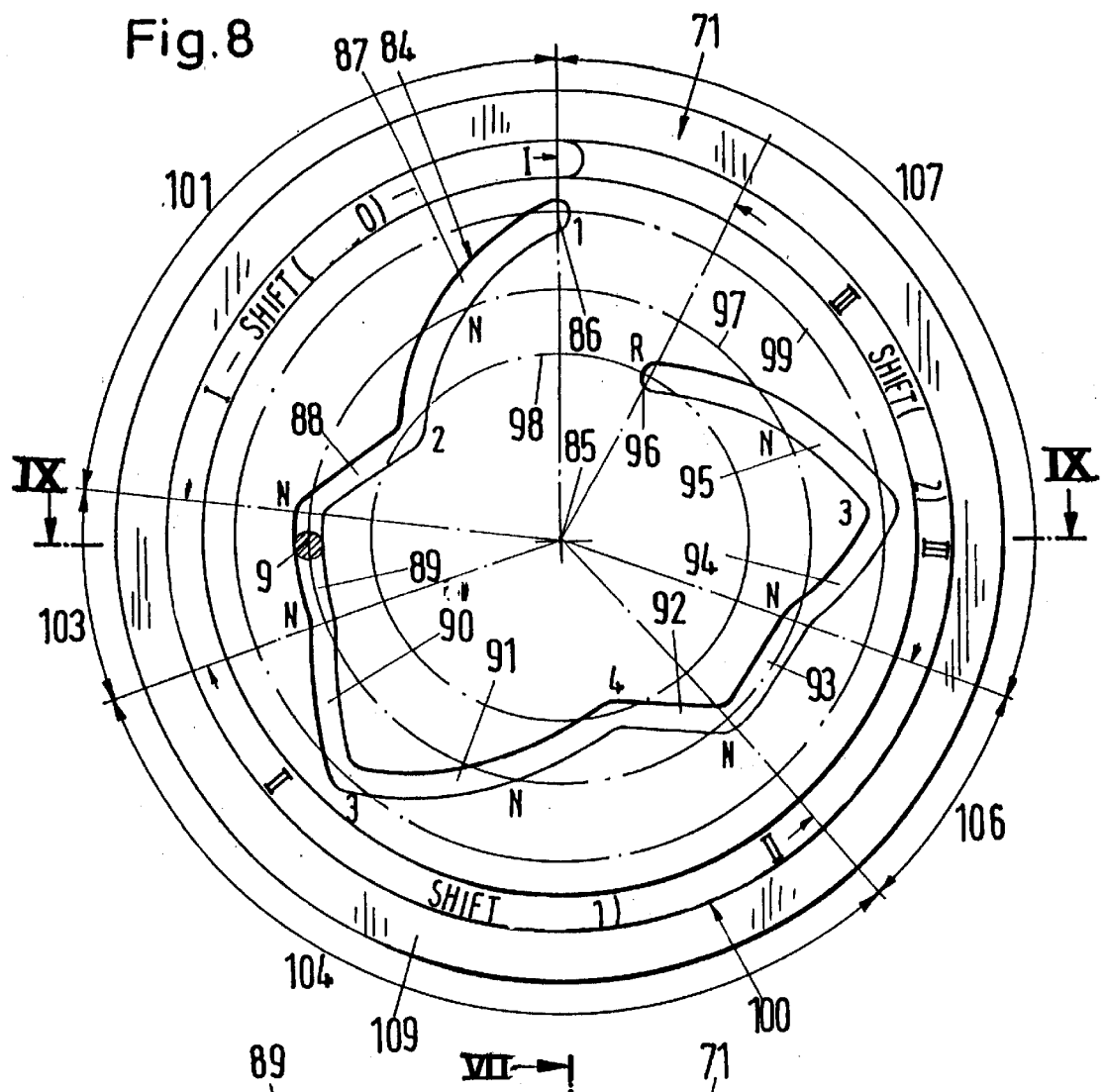
FIG. 8 shows the bottom view of a control element of the control device according to FIG. 6.

FIG. 8 shows the course of the gate change 84. In order to achieve a displacement of the selector shaft 3 for shifting into the various gears, the gate change 84 has different inclined guide portions. When the first gear has been selected, the bolt 9 of the sleeve 4 is positioned at the end 86 of the gate change 84 (FIG. 8). In order to be able to shift from first into second gear, a guide portion 87 is provided which extends from the end 86 at a slant inwardly, i.e., at an angle to the circumferential direction of the control disk 71. Since this guide portion 87 does not extend in the circumferential direction, the bolt 9 and thus the sleeve 4 is displaced to the right in FIG. 6 upon rotation of the control disk 71.

Connected to the guide portion 87 is a guide portion 88 which has the opposite incline and extends at an angle radially outwardly. When the bolt 9 of the sleeve 4 is positioned in this guide portion, the selector shaft 3 is displaced to the left into the neutral position 9 with the aid of the sleeve 4. The guide portion 88 has connected thereto a guide portion 89 which extends in the circumferential direction of the control disk 71. Upon rotation of the control disk 71, the sleeve 4 and thus the selector shaft 3 are not displaced as long as the bolt 9 remains within this guide portion 89.

Connected to the circumferentially extending portion 89 is a slantedly arranged, outwardly extending guide portion 90. The bolt 9 is moved in it when the third gear is to be selected. In this case, upon rotation of the control disk 71, the selector shaft 3 is displaced to the left in FIG. 6.

Adjacent to the guide portion 90 a guide portion 91 is provided that extends at a slant inwardly and in which the bolt 9 is moved upon switching from third to fourth gear. The selector shaft 3 in this case is displaced to the right in FIG. 6 when the bolt 9 is moved within this guide portion 91.

In order to shift from fourth gear into the neutral position N, guide portion 92 is provided which extends at a slant radially outwardly and has a transition into guide portion 93. It extends, like the guide portion 89, in the circumferential direction of the control disk 71. Upon switching from fourth gear into the neutral position, the selector shaft 3 is displaced by the bolt 9 and the sleeve 4 to the left in FIG. 6. When the bolt 9 is moved within the guide portion 93 of the gate change 84, the selector shaft 3 is not axially displaced because the guide portion 93 extends in the circumferential direction of the control disk 71.

In order to be able to switch from the neutral position N into the fifth gear, a slantedly arranged, outwardly oriented guide portion 94 is connected to the guide portion 93. When the control disk 71 is rotated correspondingly, the selector shaft 3 is displaced to the left in FIG. 6.

In order to be able to switch from fifth gear into reverse gear R, a guide portion 95 is connected to the guide portion 94 and extends at a slant radially inwardly. Once the reverse gear R has been selected, the bolt 9 rests at the end wall 96 of the gate change 84.

As shown in FIG. 8, the guide portions 89 and 93 of the gate change 84 are positioned on a common circle 97 about the axis of rotation 85 of the control disk 71. When the second or fourth or the reverse gear R are selected, the bolt 9 is positioned on a circle 98 about the rotational axis 85 of the control disk 71.

This circle 98 has a smaller diameter than the circle 97. When the first, third, or fifth gear are selected, the bolt 9 is positioned on a circle 99 about the axis of rotation 85 of the control disk 71. The circle 99 has a greater diameter than the circle 97.

With a corresponding displacement of the toothed rack 78 by the piston on the piston rod 81 that is loadable at both ends, the control disk 71 is rotated in the desired direction in order to axially displace the selector shaft 3 in the desired direction. This axial displacement moves the selector shaft 3 relative to the sleeve 65. Since the arms 66, 67 rest at the abutments 68, 69, an accidental movement of the sleeve 65 is reliably prevented.

Figure 7:
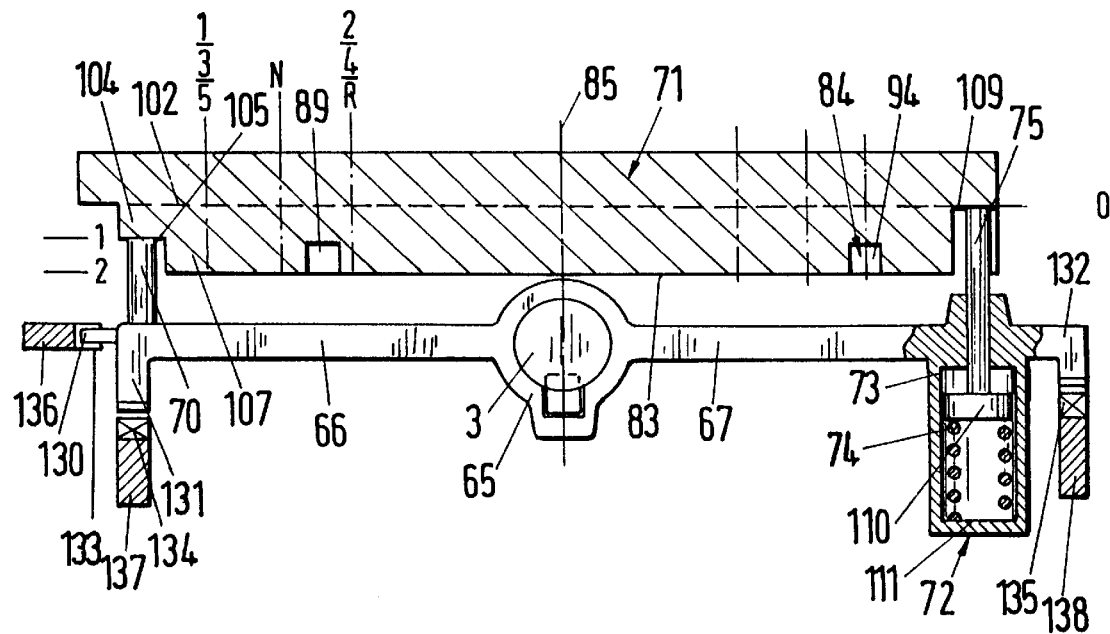
FIG. 7 shows a section along the lines VII—VII in FIG. 9.

In order to be able to select the desired gear, the required gate of the transmission must be selected. For this purpose the sleeve 65 with arms 66, 67, which is pivotable about the axis of the selector shaft 3, rotates the selector shaft 3 in the desired direction about its axis. In order to be able to perform this rotation of the selector shaft 3, the control disk 71 is provided at its underside 83 with a control path 100 that extends coaxially to the rotational axis 85 of the control disk 71 and surrounds the gate change 84 at a distance (FIG. 8). The control path 100 has a control path section 101 which extends over an angular distance of approximately 90°. Its underside 102 is axially recessed relative to the underside 83 of the control disk 71 (FIG. 7). This underside 102 extends over its length parallel to the underside 83 of the disk. In FIG. 7, this level of the underside is indicated with reference numeral 0. As long as the pin 70 is moved along this underside 102 of the control path section 101, the sleeve 65 with arms 67 and 66 is not pivoted about the axis of the selector shaft 3. The control path section 101 is correlated with the guide portions 87 and 88 of the gate change 84. The bolt 9 of the sleeve 4 is moved within these two guide portions 87, 88 when shifting from the first into the second gear and vice versa occurs.

During this switching process the selector shaft 3 must not be rotated about its axis. This is ensured by the disclosed parallel arrangement of the underside 102 to the underside 83 of the disk.

The control path section 101 has a transition into an inclined portion 103 which is correlated with the guide portion 89 of the gate change 84. The inclined portion 103 and the guide portion 89 extend over the same angular distance. Since the selector shaft 3 cannot be axially displaced when the bolt 9 is moved within the guide portion 89 of the gate change 84, the selector shaft 3 can be rotated about its axis in this area. The pin 70 glides on the guide section 103 so that the sleeve 65 with arms 66, 67 is pivoted about the axis of the selector shaft 3. Since the sleeve 65 is rotationally fixedly seated on the selector shaft 3, the selector shaft 3 is also correspondingly rotated. In this manner the next gate can be selected. The control path section 101 has coordinated therewith gate I, as shown in the embodiment of FIG. 8. Via the inclined portion 103, the pin 70 reaches the next control path section 104 which corresponds to the gate II. The underside 105 (FIG. 7) of the control path section 104 extends parallel to the underside 102 of the control path section 101 as well as to the underside 83 of the disk. The underside 105 has a smaller axial distance from the underside 83 of the disk then the underside 82 of the path portion 101. In FIG. 7 the pin 70 of the arm 66 rests at the underside 105. When the pin 70 is moved along the underside 105 upon rotation of the control disk 71, the sleeve 65 with arms 66, 67 is not pivoted and the selector shaft 3 is thus not rotated about its axis. In this angular range the bolt 9 of the sleeve 4 can be moved within the guide portions 90 to 92 of the gate change 84 and shifting into third and fourth gear may take place. The selector shaft 3 is axially displaced in the manner disclosed above.

The guide portion 93 of the gate change 84, extending in the circumferential direction of the control disk 71, has correlated therewith an inclined portion 106 of the control path 100 which extends over the same angular distance as the guide portion 93. When the pin 70 is moved along the inclined portion 106, it is moved from the control path section 104 into the control path section 107. The underside 108 of section 107 is positioned in the same plane as the underside 83 of the disk. The height level of the section 105 is indicated in FIG. 7 with reference numeral 1 and the height level of the section 108 is indicate with reference numeral 2. Via the inclined portion 107 the pin 70 is moved from the level 1 of the underside 105 of the control path portion 104 onto the level 2 of the underside 108 of the control path portion 107. In the representation according to FIG. 7, the sleeve 65–67 is pivoted counter-clockwise when the pin 70 is moved via the inclined portion 106 onto the control path portion 107. The selector shaft 3 is thus also rotated counter-clockwise about its axis. In this manner, the gate III of the transmission is selected. From this gate III the fifth gear and the reverse gear R can be selected.

As in the previous embodiment, the different guide portions of the gate change 84 of the control disk 71 have correlated therewith control path portions of the control path 100 so that the selector shaft 3 can either be rotated about its axis or displaced in its axial direction.

The control disk 71 is a flat part so that this control device only requires a minimal constructive height.

At the underside 83 of the control disk 71 an axially recessed annular surface 109 is provided which is preferably positioned at the level 0 and is positioned coaxially to the axis of rotation 85 of the control disk 71 at its circumference. The annular surface 109 is positioned parallel to the underside 83 of the disk 71 and serves as an abutment surface for the return pin 75. Upon rotation of the control disk 71, the return pin 75 is forced by the spring 74 constantly onto the annular surface 109. The return pin 75 ensures that the sleeve 65–67 is pivoted in the clockwise direction when the pin 70 is moved from a higher level of the control path 100 onto a lower level. Since the pressure springs 74 within the receiving unit 73 is supported at a collar 110 of the return pin 75, which is resting at the annular surface 109, the pressure spring 74 acts on the bottom 111 of the receiving unit 73 so that the entire sleeve 65–67 is loaded in the clockwise direction. When the pin 70 is moved along one of the two inclined portions 103, 106 of the control path 100 toward a lower level, the sleeve 65–67 is thus pivoted in the clockwise direction whereby the arm 67 is moved relative to the return pin 75. In this manner, it is ensured that the sleeve 65–67 rests at all times with the pin 70 at the respective inclined portion or control path section of the control path 100.

Figure 9:
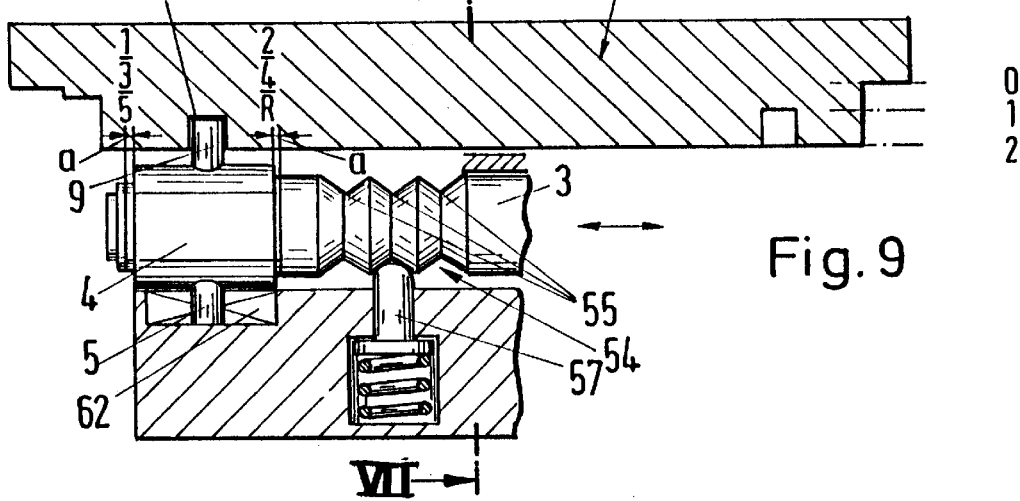
FIG. 9 shows a section along the line IX—IX of FIG. 8.

As shown in FIG. 9, the selector shaft 3 comprises a locking device 54 with locking locations 55 in which in contrast to the previous embodiment only one lock bolt 57 is engaged. The lock bolt 57 ensures that the selector shaft 3 is not axially displaced upon rotation about its axis. As in the previous embodiment, the three locking locations 55 are in the form of annular grooves for the three gates I through III of the transmission.

For selecting a respective gate of the transmission only a minimal force is required. Accordingly, for pivoting the control arm 12 (FIG. 1 through FIG. 5), respectively, the sleeve 65–67 (FIGS. 6 through 9), only a correspondingly minimal force is required. With the control cylinders 39, 79 a high force required for selecting the different gears can be produced. Synchronization takes place within the transmission whereby a controlled force increase to the maximum force occurs until the claws of the synchronizing transmission engage in a manner known per se. With the control cylinders this controlled force increase can be performed in a simple and reliable manner.

As shown in FIG. 7, the free ends of the arms 66, 67 are provided with positive-locking elements 130 to 132 which engage corresponding positive-locking openings 133 to 135 of switching rods 136 to 138 of the transmission. The switching rods 136 to 138 are connected in a manner known per se with switching forks to the corresponding transmission parts.

Figure 10:
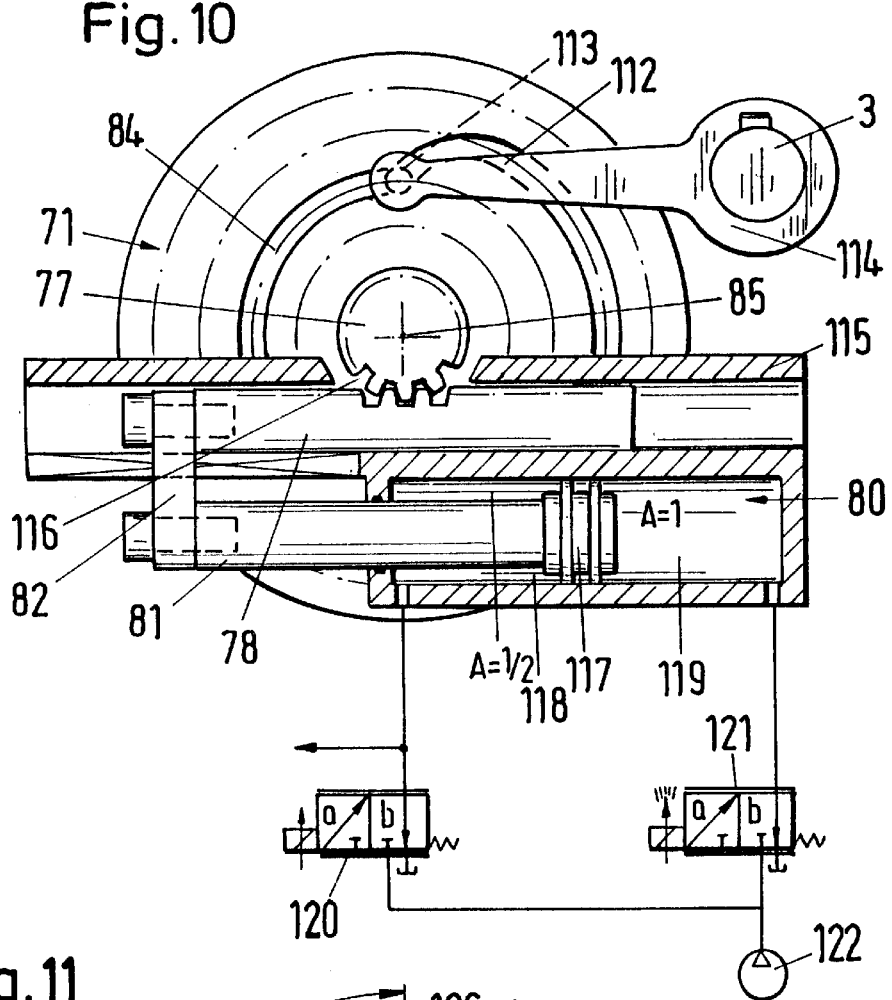
FIG. 10 shows, partly in section and partly in an end view, a control element of a third embodiment of the inventive control device.
Figure 11:
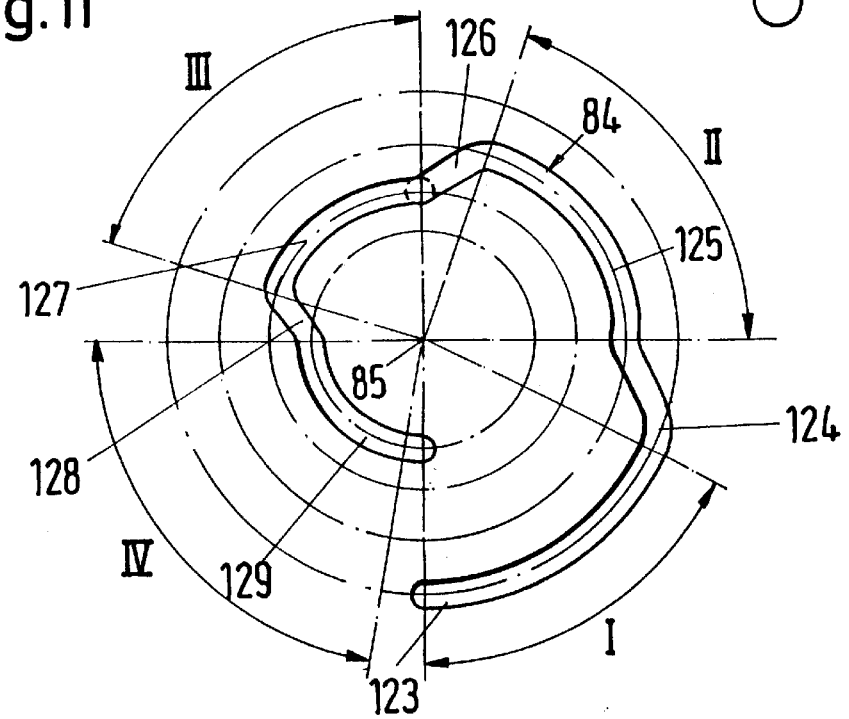
FIG. 11 shows a gate change of the control member according to FIG. 10.

In the embodiment according to FIGS. 10 and 11 the control device comprises a control disk 71 with gate change 84. A control arm 112 with an attached guide element 113 engages with its free end the gate change 84. The guide element 113 has a diameter that corresponds to the width of the gate change 84, as has been disclosed in connection with bolt 9 of the embodiment according to FIGS. 1 through 5. The control arm 112 projects radially from a sleeve 114 which is rotationally fixedly connected to the selector shaft 3 of the transmission. The axis of the selector shaft 3 extends parallel to the axis of rotation 85 of the control disk 71. As in the previous embodiment, the control disk 71 is rotationally fixedly connected to the gear wheel 77 that engages the toothed rack 78 guided within a housing 115. In the area of the gear wheel 77 the housing 115 has an opening 116 so that the gear wheel 77 and the toothed rack 78 can mesh.

A bracket-shaped holder 82 is connected to one end of the toothed rack 78. It projects transversely to the rack 78 and is connected with its free end to the piston rod 81 that projects from the control cylinder 80. Its housing is preferably a unitary part of the housing 115 in which the toothed rack 78 is received. On the free end of the piston rod 81 a piston 117 is positioned within the control cylinder 80. The piston 117 separates two pressure chambers 118 and 119 within the control cylinder 80. The end face of the piston 117, facing the pressure chamber 119 and loadable with the hydraulic medium, is greater than the opposite end face of the piston 117 which faces the pressure chamber 118. In the shown embodiment the end face facing the pressure chamber 119 is twice as large as the end face of the piston facing the pressure chamber 118. A switching valve 120 is connected to the pressure chamber 118 and a switching valve 121 is connected to the pressure chamber 119. A pump 122 is connected to both switching valves and supplies the pressure chambers 118, 119 with hydraulic medium. By reciprocating the piston rod 71, the holder 82 entrains also the toothed rack 78 which rotates the gear wheel 77 and thus the control disk 71 about the axis 85 in the required direction.

In contrast to the previous embodiment, the gate change 84 is designed such that four gears of the transmission can be shifted with it. The gate change 84 has, as shown in FIG. 11, a guide portion 123 extending along a circular arc about the axis of rotation 85 of the control disk 71. As long as the guide element 113 of the control arm 112 is positioned within this circumferential guide portion 123, the selector shaft 3 is not rotated about its axis because this circumferential guide portion 123 extends coaxially to the axis of rotation 85 of the control disk 71.

The circumferential guide portion 123 has connected thereto an inclined guide portion 124 extending at a slant inwardly. Since this guide portion 124 extends at an angle to the circumferential direction of the control disk 71, the control arm 112 is pivoted in the corresponding direction as soon as the guide element 113 is positioned within the inclined guide portion 124. Thus, the selector shaft 3 is rotated in the desired direction.

The inclined guide portion 124 has a transition in the circumferential direction of the control disk 71 into a circumferential guide portion 125 which, in comparison to the circumferential guide portion 123 is positioned at a smaller radius. Thus, the control arm 112 is not pivoted and accordingly the selector shaft 3 is not rotated about its axis when the guide element 113 is moved within this guide portion 125.

The guide portion 125 has connected thereto an inclined guide portion 126 that extends at a slant inwardly and a further guide portion 127 extending in the circumferential direction of the control disk 71. This circumferential guide portion 127 is positioned on a smaller radius about the axis of rotation 85 than the guide portion 125. As long as the guide element 113 of the control arm 112 is moved within this guide portion 127, the selector shaft 3 is not rotated about its axis.

The guide portion 127 has connected thereto an inclined guide portion 128 which extends at a slant inwardly and a further guide portion 129 extending in the circumferential direction of the control disk 71, guide portion 129 is again positioned at a smaller radius about the axis of rotation 85 of the control disk 71 than the guide portion 127. When the guide element 113 is positioned within this guide portion 129, the selector shaft 3 is not rotated about its axis.

The guide portion 123 is correlated with the gate I, the guide portion 125 is correlated with the gate II, the guide portion 127 is correlated with the gate III, and the guide portion 129 is correlated with the gate IV. Via the respective inclined guide portions 124, 126, and 128, the respective gate of the transmission can be selected. The four gates are provided for a six speed transmission.

In order to be able to select the respective gear of the transmission, in a first step the piston rod 81 is reciprocated in one or the other direction and the toothed rack 78 is thus displaced. Via the gear wheel 77 the control disk 71 is thus rotated in the required direction. When, for example, the guide element 113 of the control arm 112 is positioned within the guide portion 123 of the gate change 84 which corresponds to the gate I, the control disk 71 is rotated about its axis 85 such that the guide element 113 is moved into the inclined guide portion 124. Since this guide portion 124 is positioned at an angle to the circumferential direction of the control disk 71, the control arm 112 is pivoted so that the selector shaft 3 is rotated about its axis. When the guide element 113 has reached the guide portion 125 of the gate change 84, the gate II has been selected. Now it is possible to select the desired gear in a manner which will be disclosed in the following.

In the manner disclosed above, the desired gates I to IV are selected via the respective inclined guide portions 124, 126, 128. The selector shaft 3 is rotated about its axis via the control arm 112 into the desired position. In order to move the piston rod 81 out of the control cylinder 8, the switching valve 121 is switched into position a so that the hydraulic medium can be supplied by the pump 122 into the pressure chamber 119. The switching valve 120 is also switched into position a. Since the end face of the piston 117 facing the pressure chamber 119 is greater than the annular surface of the piston facing the pressure chamber 118, the piston is moved to the left in FIG. 10 and the piston rod 81 is thus moved out of the housing. The hydraulic medium contained within the pressure chamber 118 is returned via the switching valve 120 to the switching valve 121.

When it is desired to return the piston rod 81 into the control cylinder 80, the switching valve 121 is switched so that the pressurized hydraulic medium returns via the switching valve 120 into the pressure chamber 118 so that the piston rod 81 is returned.

In contrast to the previous embodiment, the gate change 84 of the control disk 71 has no control path coordinated therewith. The selector shaft 3, after selecting the respective gate, is axially displaced with a further actuator in order to select the desired gear. For this purpose, an additional piston-cylinder unit may be provided which is positioned parallel or aligned with the selector shaft 3 and is drivingly connected therewith.

When the guide element 113 of the control arm 112 is positioned in one of the guide portions 123, 125, 127, 129 corresponding to the respective gates I–IV, the rotational position of the selector shaft 3 is fixed. Since these guide portions extend concentrically to the axis of rotation 85 of the control disk 71, it is not necessary for the rotational position of the selector shaft 3 that the guide element 113 within the respective guide portion 123, 125, 127, 129 assumes a certain position. The guide element 113 of the control arm 112 can be positioned at the beginning, at the center or at the end of the respective guide portion without affecting in any way the rotational position of the selector shaft 3. The respective angular length of the guide portions 123, 125, 127, 129 of the gate change 84 thus provides a tolerance field for the shift position. For this reason, simple and inexpensive switching valves 120, 121 can be used for the shift movement, i.e., for the rotation of the selector shaft 3 about its axis. Since furthermore only the gate change 84 is needed but not an additional control path, the control device can be of a very simple constructive design. After selecting the respective gates I through IV, the respective actuator for displacing the selector shaft 3 in the axial direction can be activated.

In FIG. 10 the dash-dotted lines indicate the different positions of the control arm 112 when its guide element 113 is positioned in the four guide portions 123, 125, 127, 129 of the gate change 84.

The present invention is, of course, in no way restricted to the specific disclosure of the specification and drawings, but also encompasses any modifications within the scope of the appended claims.

What I claim is:

1. A control device for automatically operating a manual transmission of a vehicle, said control device comprising:
   at least one actuator for moving a selector shaft of the transmission by rotation and axial translatory movement in order to select a gate and a gear of the manual transmission;
   a control member coupled to said at least one actuator so as to be rotated by said at least one actuator;
   said control member comprising a gate change for effecting the axial translatory movement of the selector shaft and a control path for rotating the selector shaft.

2. A device according to claim 1, wherein said actuator is a hydraulically operated piston-cylinder unit.

3. A device according to claim 1, wherein:
   said actuator comprises a toothed rack;
   said control member comprises a gear wheel;
   said toothed rack meshes with said gear wheel.

4. A device according to claim 1,. wherein an axis of said control member extends parallel or perpendicular to an axis of rotation of the selector shaft.

5. A device according to claim 1, wherein said gate change is a depression in said control member.

6. A device according to claim 1, wherein said gate change is located at a periphery of said control member.

7. A device according to claim 6, wherein said control member is a sleeve.

8. A device according to claim 1, wherein said gate change in a circumferential direction of said control member has upwardly and downwardly inclined guide portions for selecting the gears of the transmission.

9. A device according to claim 1, wherein said gate change in a circumferential direction of said control member has neutral guide portions for selecting a neutral position of the transmission.

10. A device according to claim 9, wherein said control path includes control path sections, extending concentrically to an axis of rotation of said control member, for selecting gates of the transmission.

11. A device according to claim 10, wherein said control path sections have different spacings from said axis of rotation of said control member.

12. A device according to claim 10, wherein said control path sections are located at a periphery of said control member.

13. A device according to claim 10, wherein said control path includes inclined portions positioned between said control path sections for connecting said control path sections.

14. A device according to claim 13, wherein said inclined portions are correlated with said neutral guide portions of said gate change.

15. A device according to claim 1, comprising a drive member axially fixedly connected to the selector shaft, said drive member comprising a guide element engaging said gate change.

16. A device according to claim 15, wherein said drive member is secured against rotation.

17. A device according to claim 1, further comprising a rotary part having a sensor, said sensor resting on said control path.

18. A device according to claim 17, wherein said rotary part is fixedly connected to the selector shaft.

19. A device according to claim 17, wherein said sensor is spring-loaded toward said control path.

20. A device according to claim 17, wherein said rotary part is a sleeve.

21. A device according to claim 17, wherein said sensor is a transverse arm extending transversely from said rotary part.

22. A device according to claim 21, wherein said sensor comprises a glide member and said glide member contacts said control path.

* * * * *